(12) United States Patent
Wilhelm et al.

(10) Patent No.: US 10,668,948 B2
(45) Date of Patent: Jun. 2, 2020

(54) VEHICLE STEERING DEVICE

(71) Applicant: JTEKT CORPORATION, Osaka-shi, Osaka (JP)

(72) Inventors: Frederic Wilhelm, Obernai (FR); Tsutomu Tamura, Nara (JP); Robert Fuchs, Nara (JP); Maxime Moreillon, Nara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/395,327

(22) Filed: Apr. 26, 2019

(65) Prior Publication Data

US 2019/0248412 A1 Aug. 15, 2019

Related U.S. Application Data

(63) Continuation of application No. 15/379,937, filed on Dec. 15, 2016, now Pat. No. 10,358,164.

(30) Foreign Application Priority Data

Dec. 24, 2015 (JP) .................................. 2015-252324

(51) Int. Cl.
*B62D 6/10* (2006.01)
*B62D 5/04* (2006.01)
(Continued)

(52) U.S. Cl.
CPC ............. *B62D 6/10* (2013.01); *B62D 5/0409* (2013.01); *B62D 5/0466* (2013.01); *B62D 6/08* (2013.01);
(Continued)

(58) Field of Classification Search
CPC ...... B62D 6/10; B62D 5/0409; B62D 5/0466; B62D 6/08; B62D 3/04; B62D 3/12; G01L 3/10
(Continued)

(56) References Cited

U.S. PATENT DOCUMENTS

| 8,140,222 | B2 | 3/2012 | Watanabe et al. | |
| 10,358,164 | B2 * | 7/2019 | Wilhelm | B62D 5/0409 |

(Continued)

FOREIGN PATENT DOCUMENTS

| JP | 2002104223 A | 4/2002 |
| JP | 2004-050972 A | 2/2004 |

(Continued)

OTHER PUBLICATIONS

Nov. 24, 2017 Extended Search Report issued in European Patent Application No. 16205755.8.
(Continued)

*Primary Examiner* — Jacob D Knutson
(74) *Attorney, Agent, or Firm* — Oliff PLC

(57) ABSTRACT

A vehicle steering device includes a steering wheel, an input shaft, an output shaft coupled to the input shaft via a torsion bar, an electric motor, a torque detector that detects a torsion bar torque applied to the torsion bar, a rotational angle detector that detects a rotational angle of the electric motor, and a microcomputer. The microcomputer is configured to estimate a driver torque applied to the steering wheel using at least (i) the torsion bar torque detected by the torque detector, (ii) the rotational angle of the electric motor detected by the rotational angle detector, and (iii) a physical model that is constructed with a torsion bar viscosity and a torsion bar rigidity, and determine whether the steering wheel is operated in a hands-on state or a hands-off state based on the estimated driver torque.

6 Claims, 9 Drawing Sheets

(51) Int. Cl.
*B62D 6/08* (2006.01)
*G01L 3/10* (2006.01)
B62D 3/04 (2006.01)
B62D 3/12 (2006.01)

(52) U.S. Cl.
CPC ............... *G01L 3/10* (2013.01); *B62D 3/04* (2013.01); *B62D 3/12* (2013.01)

(58) Field of Classification Search
USPC ........................................ 180/443, 444, 446
See application file for complete search history.

(56) References Cited

U.S. PATENT DOCUMENTS

| | | | |
|---|---|---|---|
| 2003/0094330 A1 | 5/2003 | Boloorchi et al. | |
| 2005/0006170 A1 | 1/2005 | Dirrig | |
| 2005/0178609 A1* | 8/2005 | Uryu ................. | B62D 5/0481 180/446 |
| 2010/0004824 A1 | 1/2010 | Ikeda et al. | |
| 2012/0041645 A1* | 2/2012 | Benyo ................ | B62D 5/0466 701/42 |
| 2012/0205187 A1* | 8/2012 | Izutani ............... | B62D 5/046 180/446 |
| 2013/0158771 A1 | 6/2013 | Kaufmann | |
| 2014/0149000 A1 | 5/2014 | Tamura et al. | |
| 2014/0277944 A1 | 9/2014 | Bean et al. | |
| 2015/0191200 A1 | 7/2015 | Tsubaki et al. | |
| 2016/0368531 A1 | 12/2016 | Nakakuki et al. | |
| 2017/0080970 A1* | 3/2017 | Kezobo ............. | B62D 5/0457 |
| 2017/0297618 A1 | 10/2017 | Shah et al. | |
| 2018/0186406 A1* | 7/2018 | Itou ................... | B62D 1/286 |

FOREIGN PATENT DOCUMENTS

| | | |
|---|---|---|
| JP | 2004-175122 A | 6/2004 |
| JP | 2004-299491 A | 10/2004 |
| JP | 2006-182051 A | 7/2006 |
| JP | 2008-213743 A | 9/2008 |
| JP | 2009-96265 A | 5/2009 |
| JP | 2014-122017 A | 7/2014 |
| JP | 2014-144732 A | 8/2014 |

OTHER PUBLICATIONS

May 30, 2019 Office Action issued in Japanese Patent Application No. 2018-147944.

Aug. 22, 2019 Office Action issued in Japanese Patent Application No. 2015-252324.

* cited by examiner

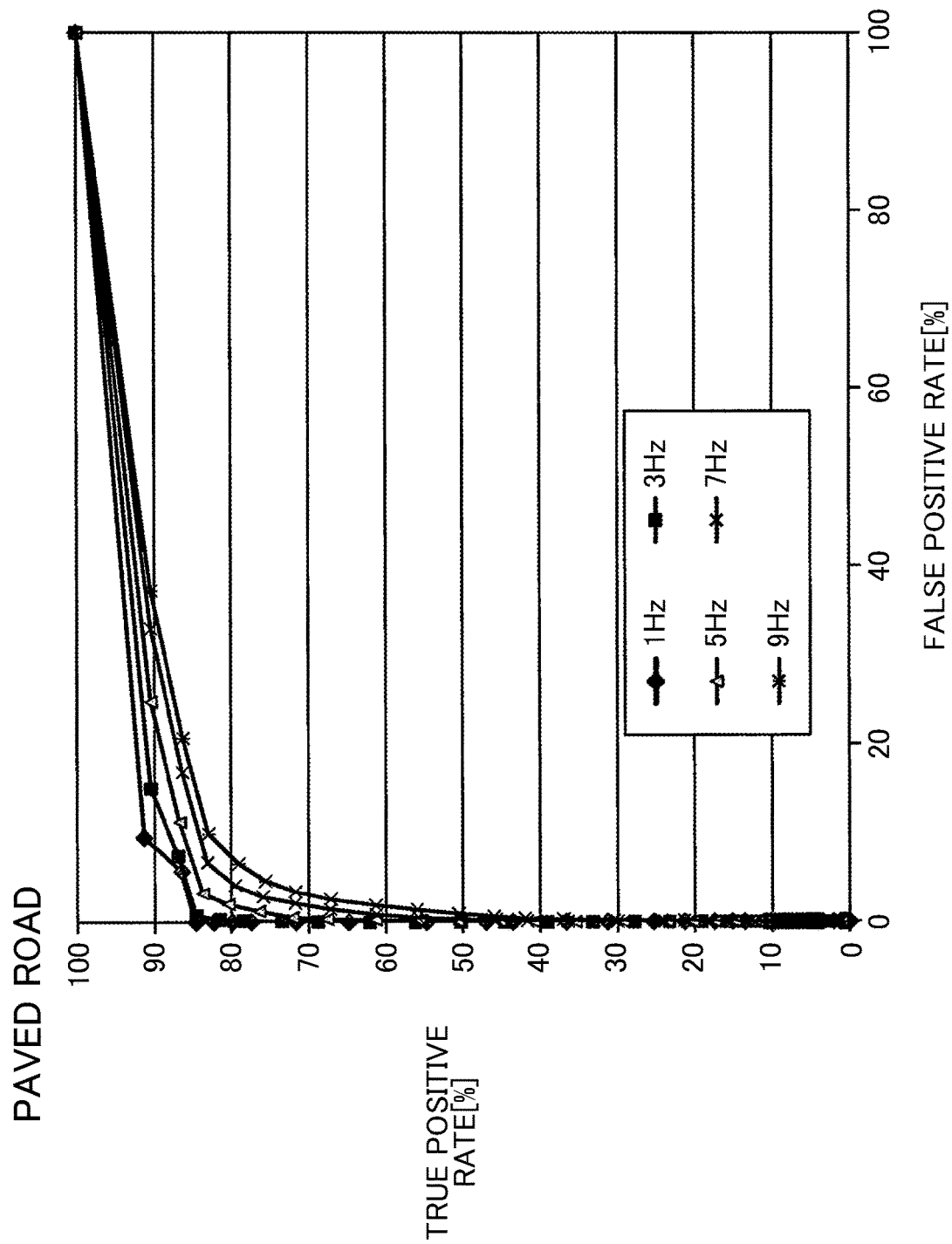

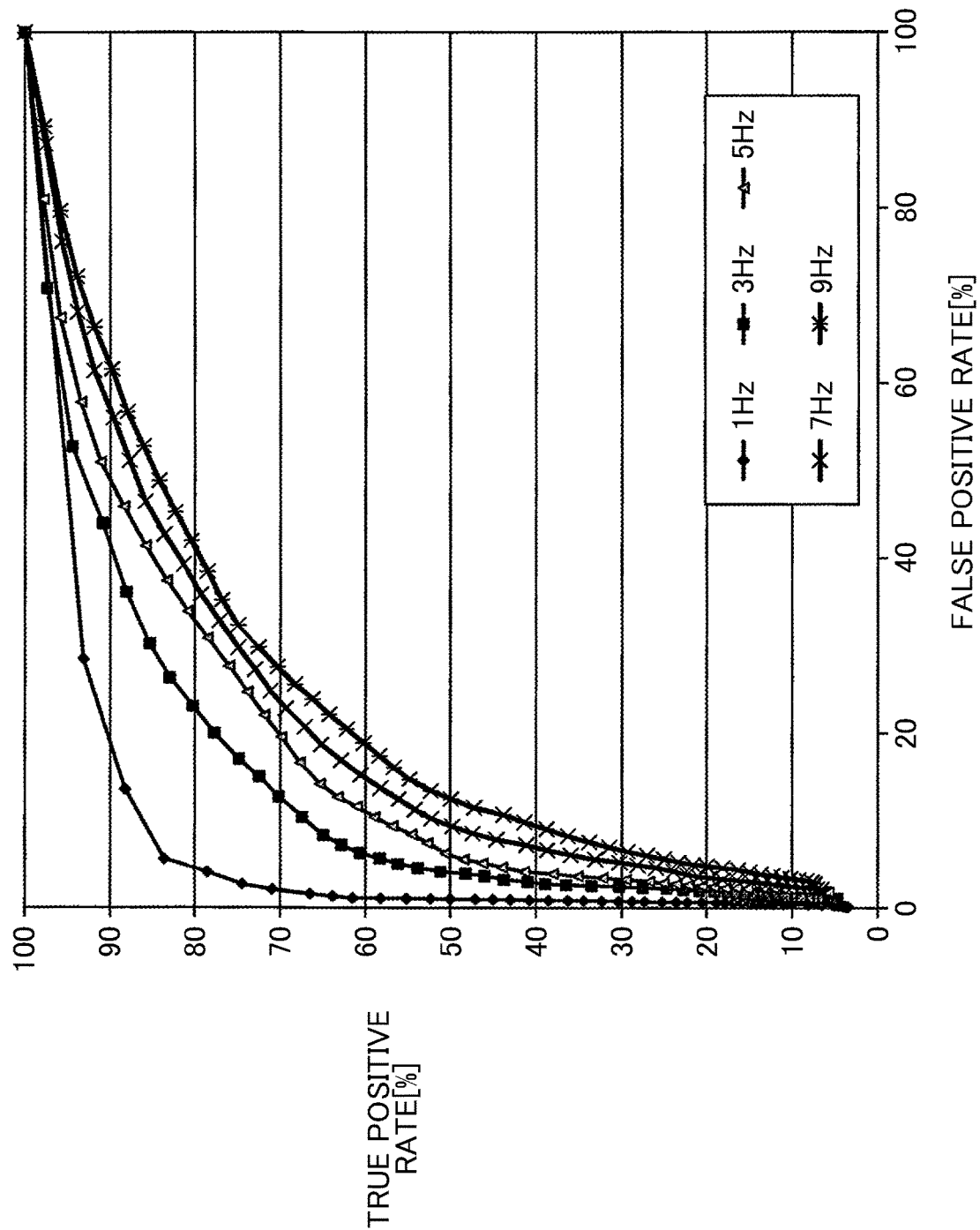

VEHICLE STEERING DEVICE

INCORPORATION BY REFERENCE

This is a continuation of U.S. patent application Ser. No. 15/379,937, filed Dec. 15, 2016, which claims the benefit of Japanese Patent Application No. 2015-252324, filed Dec. 24, 2015, the entire contents of which are hereby incorporated by reference.

BACKGROUND OF THE INVENTION

1. Field of the Invention

The present invention relates to a vehicle steering device.

2. Description of the Related Art

Japanese Patent Application Publication No. 2004-175122 (JP 2004-175122 A) discloses an electric power steering system (EPS) that includes an electronic control unit (ECU) that includes a function of determining the steering wheel operation state. The ECU described in JP 2004-175122 A computes the product of a time differential value dθh/dt of a steering angle θh detected by a steering angle sensor and torque Tp detected by a torque sensor as a work load W on the steering wheel, and determines the steering wheel operation state using the work load W. Specifically, in the case where the work load W exceeds a predetermined threshold W1 (W1>0) in the positive direction, or in the case where the work load W exceeds a predetermined threshold −W1 in the negative direction, the ECU determines an actual steering state in which a driver is operating the steering wheel.

In the case where the absolute value of the work load W is equal to or less than the threshold W1 and the absolute value of the torque Tp is equal to or less than a predetermined threshold Tp1 (Tp1>0), the ECU determines a state in which the steering wheel is not held. In the case where the absolute value of the work load W is equal to or less than the threshold W1 and the absolute value of the steering angle θh is equal to or less than a predetermined threshold θh1 (θh1>0), the ECU determines a state in which the steering wheel is held.

In the electric power steering system described in JP 2004-175122 A, if an external force (load torque) is input from a road surface when the actual steering wheel operation state indicates that the steering wheel is not held, the torque Tp and the steering angle are varied, which generates the work load W. Therefore, in the related art, it may be erroneously determined that the steering wheel is actually operated even if the steering wheel is not held. In the related art, in addition, the work load W crosses zero when the steering wheel is operated in the opposite direction even if the actual steering wheel steering state indicates that the steering wheel is actually operated. Therefore, it may be erroneously determined that the steering wheel is not held during such a time.

SUMMARY OF THE INVENTION

It is an object of the present invention to provide a vehicle steering device capable of precisely determining whether in a hands-on state in which a driver is grasping a steering wheel or a hands-off state in which the driver is not grasping the steering wheel.

An aspect of the present invention provides a vehicle steering device including:
a steering wheel;
an input shaft to which the steering wheel is coupled;
an output shaft coupled to the input shaft via a torsion bar;
an electric motor coupled to the output shaft via a speed reduction mechanism;
a torque detector that detects torsion bar torque applied to the torsion bar;
a rotational angle detector that detects a rotational angle of the electric motor; and
a steering wheel operation state determination device.

The steering wheel operation state determination device includes:
a driver torque estimation observer that estimates driver torque applied to the steering wheel by a driver using a detected value that includes at least the torsion bar torque detected by the torque detector and the rotational angle of the electric motor detected by the rotational angle detector;
a low-pass filter that performs a low-pass filtering process on the driver torque estimated by the driver torque estimation observer; and
a hands-on/off determination unit that determines whether in a hands-on state or a hands-off state on a basis of the driver torque after being subjected to the low-pass filtering process by the low-pass filter.

With this configuration, driver torque is estimated by the driver torque estimation observer. A low-pass filtering process is performed on the estimated driver torque. Consequently, it is possible to precisely estimate the driver torque applied to the steering wheel by the driver. Whether in a hands-on state or a hands-off state is determined on the basis of the driver torque after being subjected to the low-pass filtering process. Thus, it is possible to precisely determine whether in a hands-on state or a hands-off state.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7A is a graph illustrating the test result for a paved road;

FIG. 7B is a graph illustrating the test result for a bad road; and

DETAILED DESCRIPTION OF EMBODIMENTS

Figure 1:
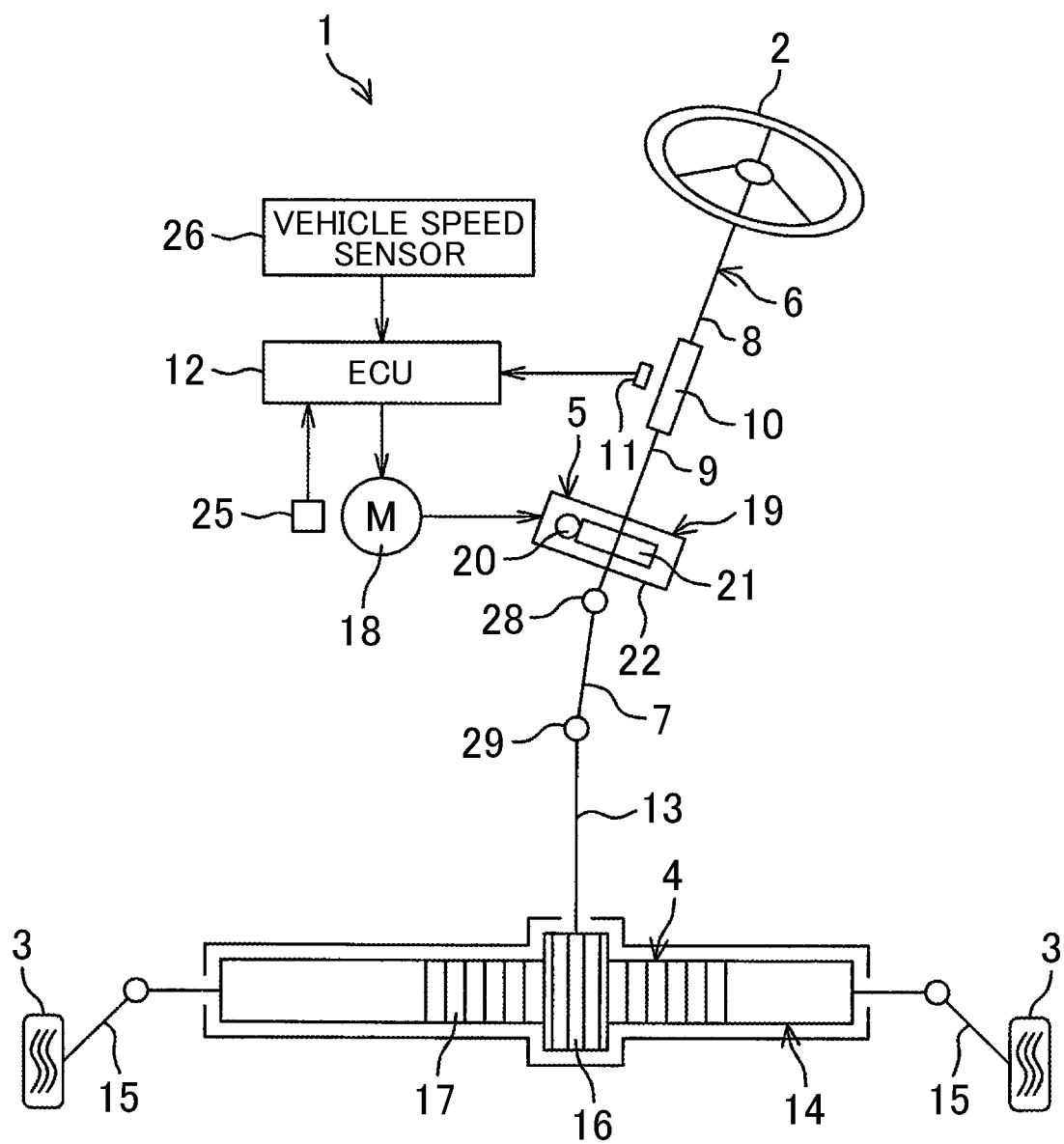
FIG. 1 is a schematic diagram illustrating a schematic configuration of an electric power steering system (EPS) according to an embodiment of the present invention.

FIG. 1 is a schematic diagram illustrating a schematic configuration of an electric power steering system (EPS) according to an embodiment of the present invention.

An electric power steering system (vehicle steering device) 1 is an electric power steering system of a column assist type (hereinafter referred to as a "column-type EPS") in which an electric motor and a speed reduction mechanism are disposed in a column portion.

The column-type EPS 1 includes a steering wheel 2 that serves as a steering member used to steer a vehicle, a steering mechanism 4 that steers steered wheels 3 in conjunction with rotation of the steering wheel 2, and a steering assist mechanism 5 that assists a driver in steering. The steering wheel 2 and the steering mechanism 4 are mechanically coupled to each other via a steering shaft 6, a first universal joint 28, an intermediate shaft 7, and a second universal joint 29.

The steering shaft 6 includes an input shaft 8 coupled to the steering wheel 2, and an output shaft 9 coupled to the intermediate shaft 7 via the first universal joint 28. The input shaft 8 and the output shaft 9 are coupled so as to be rotatable relative to each other on the same axis via a torsion bar 10. That is, when the steering wheel 2 is rotated, the input shaft 8 and the output shaft 9 are rotated in the same direction while being rotated relative to each other.

A torque sensor 11 is provided around the steering shaft 6. The torque sensor 11 detects torsion bar torque Ttb applied to the torsion bar 10 on the basis of the amount of relative rotational displacement between the input shaft 8 and the output shaft 9. The torsion bar torque Ttb detected by the torque sensor 11 is input to an electronic control unit (ECU) 12.

The steering mechanism 4 is composed of a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7 via the second universal joint 29. The pinion shaft 13 is rotated in conjunction with a steering operation of the steering wheel 2. A pinion 16 is coupled to the distal end of the pinion shaft 13.

The rack shaft 14 extends linearly along the right-left direction (which is orthogonal to the straight travel direction) of the vehicle. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered.

The steering assist mechanism 5 includes an electric motor 18 that generates a steering assist force, and a speed reduction mechanism 19 that amplifies and transfers output torque of the electric motor 18 to the steering mechanism 4. In the embodiment, the electric motor 18 is a three-phase brushless motor. The speed reduction mechanism 19 is composed of a worm gear mechanism that includes a worm gear 20 and a worm wheel 21 meshed with the worm gear 20. The speed reduction mechanism 19 is housed in a gear housing 22 that serves as a transfer mechanism housing. In the following description, the speed reduction ratio (gear ratio) of the speed reduction mechanism 19 is occasionally represented by N. The speed reduction ratio N is defined as a ratio $\omega wg/\omega ww$ of an angular velocity $\omega wg$ of the worm gear 20 to an angular velocity $\omega ww$ of the worm wheel 21.

The worm gear 20 is rotationally driven by the electric motor 18. The worm wheel 21 is coupled so as to be rotatable together with the output shaft 9. The worm wheel 21 is rotationally driven by the worm gear 20.

When the driver operates the steering wheel 2, the worm gear 20 is rotationally driven by the electric motor 18. Consequently, the worm wheel 21 is rotationally driven, which rotates the steering shaft 6 (output shaft 9) along with applying motor torque to the steering shaft 6. Rotation of the steering shaft 6 is transferred to the pinion shaft 13 via the intermediate shaft 7. Rotation of the pinion shaft 13 is converted into movement of the rack shaft 14 in the axial direction. Consequently, the steered wheels 3 are steered. That is, the worm gear 20 is rotationally driven by the electric motor 18 to enable steering assist by the electric motor 18.

Torque applied to the speed reduction mechanism 19 includes motor torque applied by the electric motor 18 and external torque other than the motor torque. The external torque other than the motor torque includes driver torque Tsw applied to the steering wheel 2 by the driver, and load torque (road load) applied to the rack shaft 14 (speed reduction mechanism 19) from the steered wheels 3.

The rotational angle of a rotor of the electric motor 18 is detected by a rotational angle sensor 25 such as a resolver. The vehicle speed is detected by a vehicle speed sensor 26. An output signal from the rotational angle sensor 25 and a vehicle speed V detected by the vehicle speed sensor 26 are input to the ECU 12. The electric motor 18 is controlled by the ECU 12.

Figure 2:
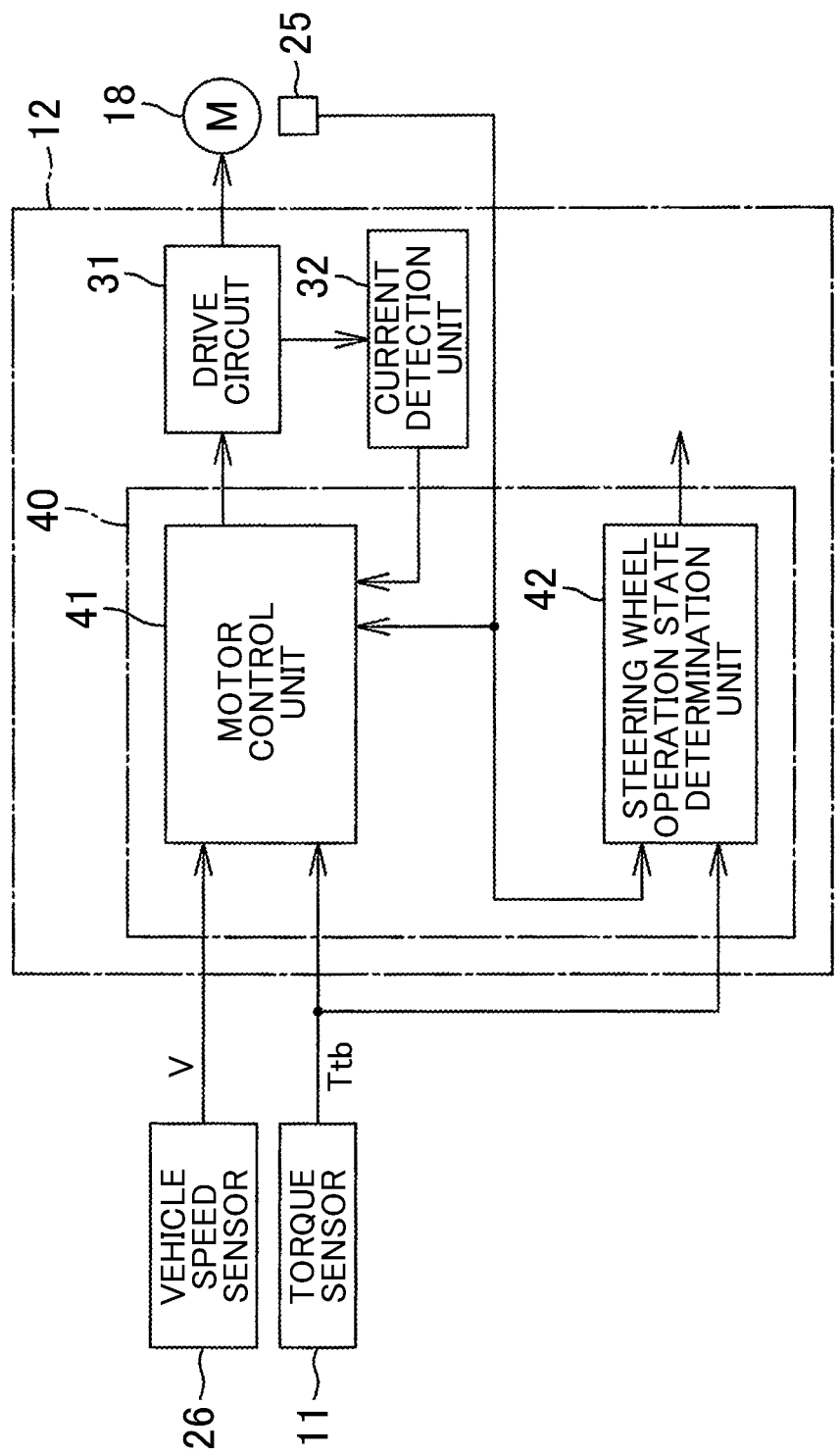
FIG. 2 is a block diagram illustrating the electric configuration of an electronic control unit (ECU)

FIG. 2 is a schematic diagram illustrating the electric configuration of the ECU 12.

The ECU 12 includes a microcomputer 40, a drive circuit (three-phase inverter circuit) 31 controlled by the microcomputer 40 so as to supply electric power to the electric motor 18, and a current detection unit 32 that detects a current (hereinafter referred to as a "motor current") that flows through the electric motor 18.

The microcomputer 40 includes a central processing unit (CPU) and a memory (such as a read-only memory (ROM), a random-access memory (RAM), and a non-volatile memory), and executes a predetermined program to function as a plurality of function processing units. The plurality of function processing units includes a motor control unit 41 and a steering wheel operation state determination unit 42.

The motor control unit 41 achieves appropriate steering assist that matches the steering condition by controlling drive of the drive circuit 31 on the basis of the vehicle speed V detected by the vehicle speed sensor 26, the torsion bar torque Ttb detected by the torque sensor 11, the rotational angle of the electric motor 18 and the motor current detected by the current detection unit 32, the rotational angle of the electric motor 18 computed on the basis of the output from the rotational angle sensor 25.

Specifically, the motor control unit 41 sets a current command value, which is a target value for the motor current which flows through the electric motor 18, on the basis of the torsion bar torque Ttb and the vehicle speed V. The current command value corresponds to a target value for a steering assist force (assist torque) that matches the steering condition. The motor control unit 41 controls drive of the drive circuit 31 such that the motor current detected by the current detection unit 32 becomes closer to the current command value.

The steering wheel operation state determination unit 42 determines, on the basis of the torsion bar torque Ttb detected by the torque sensor 11 and the rotational angle of the electric motor 18 computed on the basis of the output from the rotational angle sensor 25, whether in a hands-on state in which the driver is grasping the steering wheel or a hands-off state in which the driver is not grasping the steering wheel.

Figure 3:
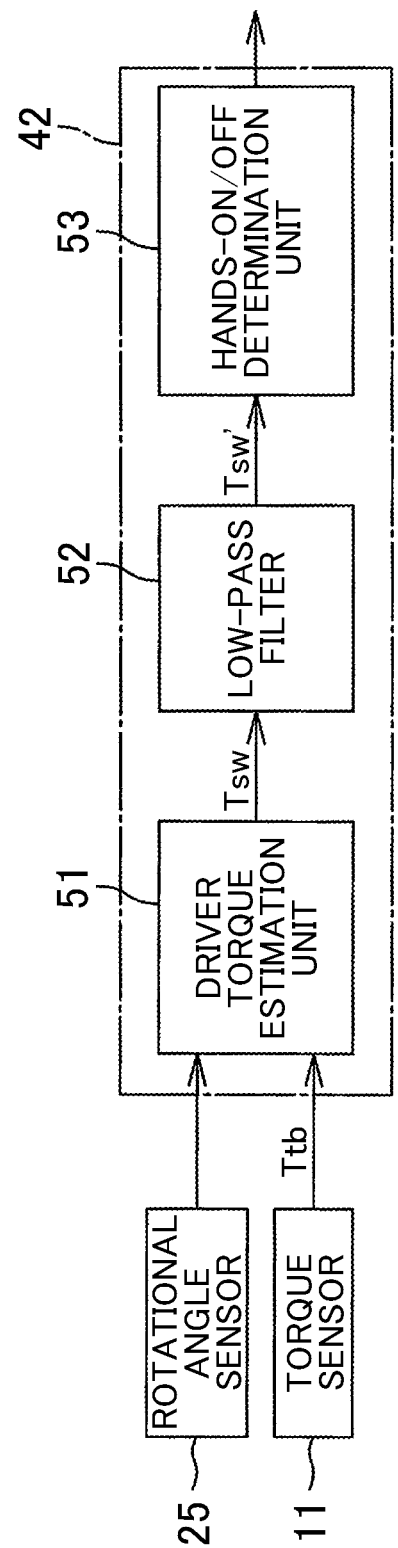
FIG. 3 is a block diagram illustrating the electric configuration of a steering wheel operation state determination unit.

FIG. 3 is a block diagram illustrating the electric configuration of the steering wheel operation state determination unit 42.

The steering wheel operation state determination unit 42 includes a driver torque estimation unit 51, a low-pass filter 52, and a hands-on/off determination unit 53. The driver torque estimation unit 51 estimates the driver torque Tsw on the basis of the output signal from the rotational angle sensor 25 and the torsion bar torque Ttb detected by the torque sensor 11. The low-pass filter 52 performs a low-pass filtering process on the driver torque Tsw estimated by the driver torque estimation unit 51. The hands-on/off determination unit 53 determines whether in a hands-on state or a hands-off state on the basis of driver torque Tsw' after being subjected to the low-pass filtering process by the low-pass filter 52. Such processes will be described below.

The driver torque estimation unit 51 estimates the driver torque Tsw applied to the steering wheel 2 by the driver using a physical model of the column-type EPS.

Figure 4:
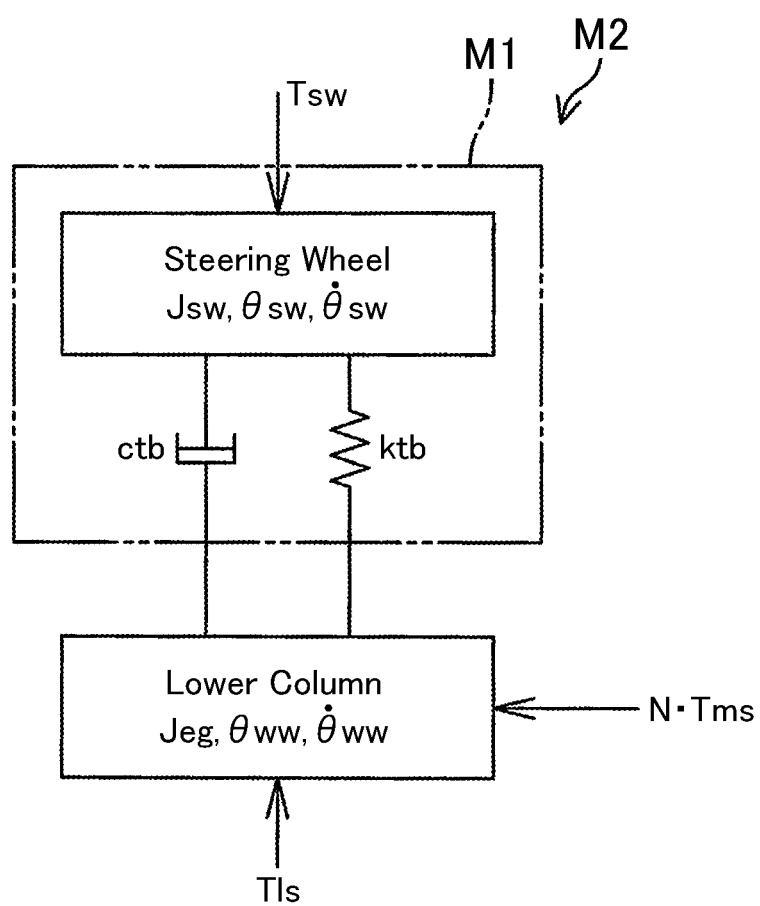
FIG. 4 is a schematic diagram illustrating the configuration of a physical model of a column-type EPS.

FIG. 4 is a schematic diagram illustrating the configuration of a physical model of a column-type EPS. The entirety of FIG. 4 represents a two-inertia-system model M2 of the column-type EPS. A portion of FIG. 4 indicated by the dashed line represents a one-inertia-system model M1 of the column-type EPS.

The one-inertia-system model M1 includes the steering wheel. The driver torque (steering wheel torque) Tsw is input to the steering wheel.

The two-inertia-system model M2 includes the steering wheel and a lower column. The lower column includes an assist motor, the worm gear, and the worm wheel. The worm gear and the worm wheel constitute the speed reduction mechanism. The driver torque Tsw is input to the steering wheel. Torque corresponding to a value N·Tms obtained by multiplying motor torque Tms by the speed reduction ratio N of the speed reduction mechanism and load torque Tls applied to the lower column from the steered wheels are input to the lower column.

The symbols used in FIG. 4 are defined as follows.
Jsw: steering wheel inertia
Tsw: driver torque
Ttb: torsion bar torque
ktb: torsion bar rigidity
ctb: torsion bar viscosity
N: speed reduction ratio
θsw: steering wheel angle
dθsw/dt: steering wheel angular velocity
Jeq: lower column inertia
θww: worm wheel angle
dθww/dt: worm wheel angular velocity
Tls: load torque (reverse input torque)

In the embodiment, the driver torque estimation unit 51 uses the one-inertia-system model M1, and estimates the driver torque Tsw using a driver torque estimation observer (disturbance observer, extended disturbance observer).

The equation of motion for the steering wheel inertia of the one-inertia-system model M1 is represented by the following formula (1).

$$J_{sw}\ddot{\theta}_{sw}=T_{sw}-k_{tb}(\theta_{sw}-\theta_{ww})-c_{tb}(\dot{\theta}_{sw}-\dot{\theta}_{ww}) \quad (1)$$

"$d^2\theta sw/dt^2$" is the acceleration of the steering wheel.

The equation of state for the one-inertia-system model M1 is represented by the following formula (2).

$$\begin{cases} \dot{\hat{x}}_e = A_e\hat{x}_e + B_e u_1 + L_e(y-\hat{y}) \\ \hat{y} = C_e\hat{x}_e + D_e u_1 \end{cases} \quad (2)$$

"^xe" (xe with a hat) in the formula (2) is a state variable vector, and is represented by the following formula (3).

$$\hat{x}_e = \begin{bmatrix} \theta_{sw} \\ \dot{\theta}_{sw} \\ T_{sw} \end{bmatrix} \quad (3)$$

"u1" in the formula (2) is an input vector, and is represented by the following formula (4).

$$u_1 = \begin{bmatrix} \theta_{ww} \\ \dot{\theta}_{ww} \end{bmatrix} \quad (4)$$

"y" in the formula (2) is an output vector (measured value), and is represented by the following formula (5). "^y" in the formula (2) is an estimated value of the output vector.

$$y=T_{tb}=k_{tb}(\theta sw-\theta ww) \quad (5)$$

"Ae" in the formula (2) is a system matrix, and is represented by the following formula (6).

$$A_e = \begin{bmatrix} 0 & 1 & 0 \\ \dfrac{-k_{tb}}{J_{sw}} & \dfrac{-c_{tb}}{J_{sw}} & \dfrac{1}{J_{sw}} \\ 0 & 0 & 0 \end{bmatrix} \quad (6)$$

"Be" in the formula (2) is an input matrix, and is represented by the following formula (7).

$$B_e = \begin{bmatrix} 0 & 0 \\ \dfrac{k_{tb}}{J_{sw}} & \dfrac{c_{tb}}{J_{sw}} \\ 0 & 0 \end{bmatrix} \quad (7)$$

"Le" in the formula (2) is an observer gain matrix, and is represented by the following formula (8).

$$L_e = \begin{bmatrix} G_1 \\ G_2 \\ G_3 \end{bmatrix} \quad (8)$$

"G1", "G2", and "G3" in the formula (8) are observer gains, and have been set in advance.

"Ce" in the formula (2) is an output matrix, and is represented by the following formula (9).

$$C_e=[k_{tb}\ 0\ 0] \quad (9)$$

"De" in the formula (2) is a direct matrix, and is represented by the following formula (10).

$$De = [-ktb \ O] \quad (10)$$

The driver torque estimation unit 51 computes the state variable vector ˆxe on the basis of the equation of state represented by the formula (2). Consequently, an estimated value of the driver torque Tsw is obtained.

Figure 5:
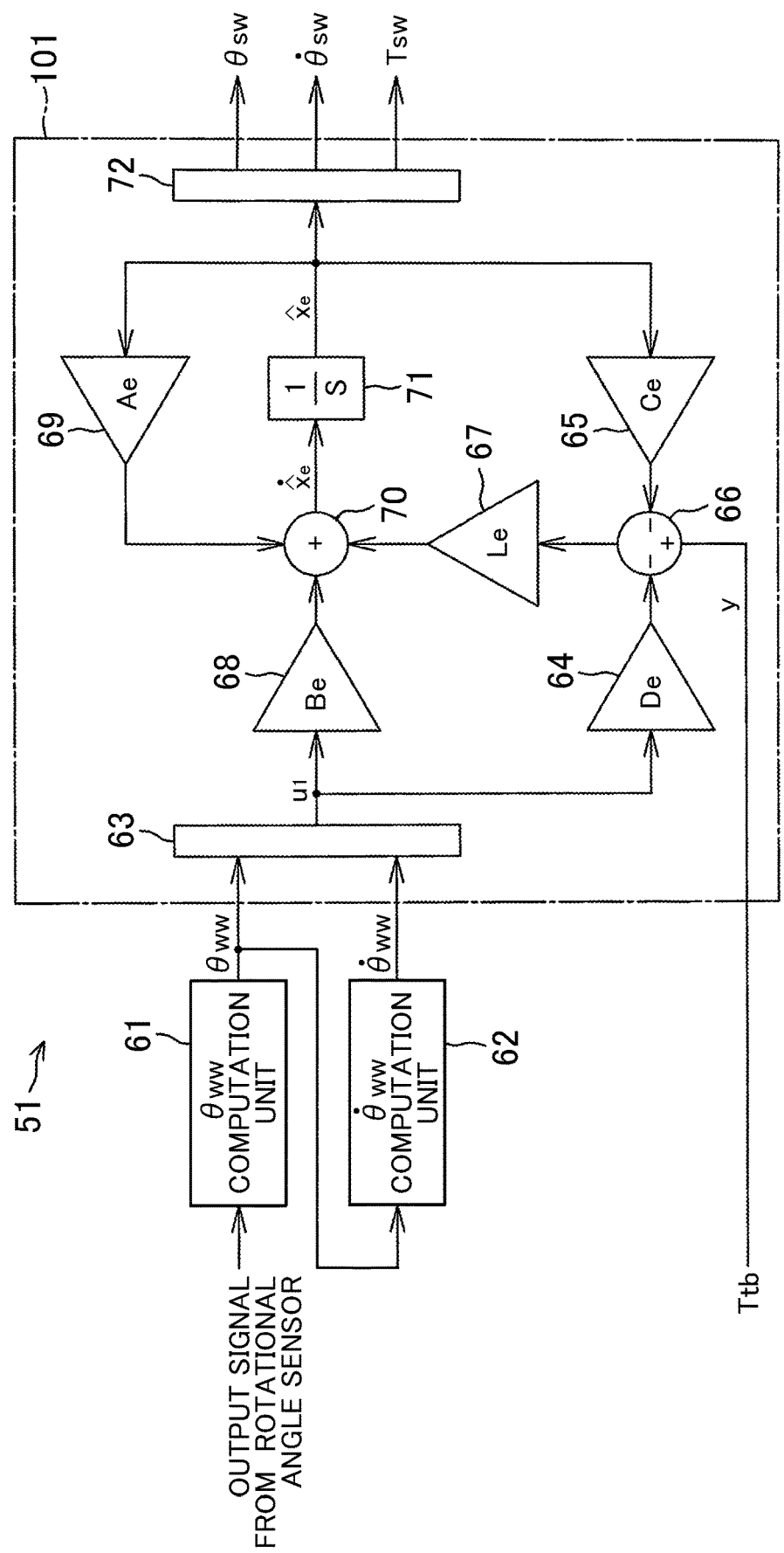
FIG. 5 is a block diagram illustrating the configuration of a driver torque estimation unit.

FIG. 5 is a block diagram illustrating the configuration of the driver torque estimation unit 51.

The driver torque estimation unit 51 includes a worm wheel angle computation unit (θww computation unit) 61, a worm wheel angular velocity computation unit 62, and a driver torque estimation observer 101. The driver torque estimation observer 101 includes an input vector input unit 63, a direct matrix multiplier 64, an output matrix multiplier 65, a first adder 66, a gain multiplier 67, an input matrix multiplier 68, a system matrix multiplier 69, a second adder 70, an integrator 71, and a state variable vector output unit 72.

The worm wheel angle computation unit 61 computes a rotational angle (hereinafter referred to as a "rotor rotational angle") θm of an output shaft of the electric motor 18 on the basis of the output signal from the rotational angle sensor 25, and computes a rotational angle (hereinafter referred to as a "worm wheel angle") θww of the worm wheel 21 on the basis of the obtained rotor rotational angle θm. Specifically, the worm wheel angle θww is computed by dividing the rotor rotational angle θm by the speed reduction ratio N of the speed reduction mechanism 19.

The worm wheel angular velocity computation unit 62 computes a worm wheel angular velocity dθww/dt by differentiating the worm wheel angle θww, which is computed by the worm wheel angle computation unit 61, with respect to the time.

The driver torque estimation observer 101 estimates the driver torque Tsw on the basis of the worm wheel angle θww computed by the worm wheel angle computation unit 61, the worm wheel angular velocity dθww/dt computed by the worm wheel angular velocity computation unit 62, and the torsion bar torque Ttb detected by the torque sensor 11.

The worm wheel angle θww computed by the worm wheel angle computation unit 61 and the worm wheel angular velocity dθww/dt computed by the worm wheel angular velocity computation unit 62 are provided to the input vector input unit 63. The input vector input unit 63 outputs the input vector u1 (see the formula (4)).

The output from the integrator 71 is the state variable vector ˆxe (see the formula (3)). When the computation is started, an initial value of the state variable vector ˆxe is provided. The initial value of the state variable vector ˆxe is zero, for example.

The system matrix multiplier 69 multiplies the state variable vector ˆxe by the system matrix Ae. The output matrix multiplier 65 multiplies the state variable vector ˆxe by the output matrix Ce (see the formula (9)). The direct matrix multiplier 64 multiplies the input vector u1 output from the input vector input unit 63 by the direct matrix De (see the formula (10)).

The first adder 66 subtracts the output (Ce·ˆxe) from the output matrix multiplier 65 and the output (De·u1) from the direct matrix multiplier 64 from the output vector (measured value) y which is the torsion bar torque Ttb detected by the torque sensor 11. That is, the first adder 66 computes the difference (y−ˆy) between the output vector y and the estimated value of the output vector ˆy (=Ce·ˆxe+De·u1).

The gain multiplier 67 multiplies the output (y−ˆy) from the first adder 66 by the observer gain Le (see the formula (8)).

The input matrix multiplier 68 multiplies the input vector u1 output from the input vector input unit 63 by the input matrix Be (see the formula (7)). The second adder 70 computes a differential value dˆxe/dt of the state variable vector by adding the output (Be·u1) from the input matrix multiplier 68, the output (Ae·ˆxe) from the system matrix multiplier 69, and the output (Le(y−ˆy)) from the gain multiplier 67. The integrator 71 computes the state variable vector ˆxe by integrating the output (dˆxe/dt) from the second adder 70. The state variable vector output unit 72 outputs the steering wheel angle (estimated value) θsw, the steering wheel angular velocity (estimated value) dθsw/dt, and the driver torque (estimated value) Tsw on the basis of the state variable vector ˆxe. The driver torque (estimated value) Tsw output from the state variable vector output unit 72 is provided to the low-pass filter 52 (see FIG. 3).

Returning FIG. 3, the low-pass filter 52 attenuates a frequency component of the driver torque Tsw from the driver torque estimation unit 51 that is higher than a predetermined cut-off frequency fc. In the embodiment, the low-pass filter 52 is a second-order Butterworth filter. The driver torque Tsw' after being subjected to the low-pass filtering process by the low-pass filter 52 is provided to the hands-on/off determination unit 53.

Figure 6:
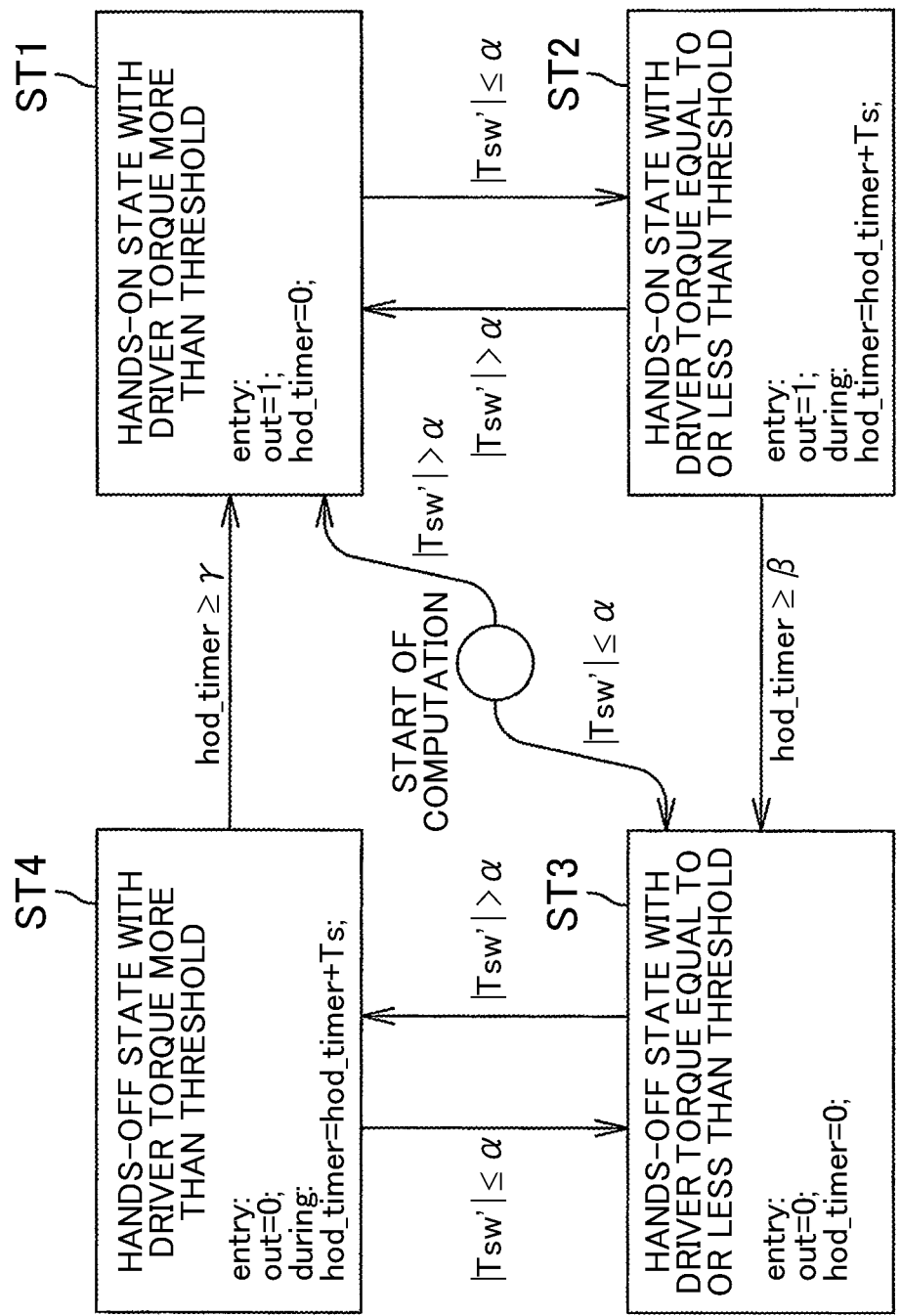
FIG. 6 illustrates state transition for explaining operation of a hands-on/off determination unit.

FIG. 6 illustrates state transition for explaining operation of the hands-on/off determination unit 53.

In the description of operation of the hands-on/off determination unit 53, the driver torque Tsw after being subjected to the low-pass filtering process by the low-pass filter 52 is referred to simply as driver torque Tsw'.

The hands-on/off determination unit 53 distinguishes four states, namely a hands-on state (ST1) with the driver torque more than a threshold, a hands-on state (ST2) with the driver torque equal to or less than the threshold, a hands-off state (ST3) with the driver torque equal to or less than the threshold, and a hands-off state (ST4) with the driver torque more than the threshold, as the state of a steering wheel operation by the driver.

In the hands-on state (ST1) with the driver torque more than the threshold, the absolute value of the driver torque Tsw' is more than a predetermined threshold α (>0).

In the hands-on state (ST2) with the driver torque equal to or less than the threshold, the absolute value of the driver torque Tsw' is equal to or less than the threshold α.

In the hands-off state (ST3) with the driver torque equal to or less than the threshold, the absolute value of the driver torque Tsw' is equal to or less than the threshold α.

In the hands-off state (ST4) with the driver torque more than the threshold, the absolute value of the driver torque Tsw' is more than the predetermined threshold α.

The threshold α is set to a value within the range of 0.1 [Nm] or more and 0.3 [Nm] or less, for example.

When the absolute value of the driver torque Tsw' is more than the threshold α at the time of start of computation, the hands-on/off determination unit 53 determines that the steering wheel operation state is the hands-on state (ST1) with the driver torque more than the threshold. The hands-on/off determination unit 53 sets an output signal (out) to one, and sets a time counter value hod_timer to zero. The output signal (out) is a signal that represents the determination result. When the output signal (out) is one, the determination result represents hands-on. When the output signal (out) is zero, the determination result represents hands-off.

When the absolute value of the driver torque Tsw' becomes equal to or less than the threshold α in the hands-on state (ST1) with the driver torque more than the threshold, the hands-on/off determination unit 53 determines that the steering wheel operation state has become the hands-on state (ST2) with the driver torque equal to or less than the threshold. The hands-on/off determination unit 53 sets the output signal (out) to one. In the case where the hands-on state (ST2) with the driver torque equal to or less than the threshold is determined, the hands-on/off determination unit 53 updates the time counter value hod_timer to a value obtained by adding a predetermined time Ts [sec] to the current value (hod_timer) each time Ts elapses.

When the absolute value of the driver torque Tsw' becomes more than the threshold $\alpha$ before the time counter value hod_timer reaches a predetermined hands-off determination threshold $\beta$ (>0) in the hands-on state (ST2) with the driver torque equal to or less than the threshold, the hands-on/off determination unit 53 determines that the steering wheel operation state has become the hands-on state (ST1) with the driver torque more than the threshold, and sets the time counter value hod_timer to zero.

When the time counter value hod_timer reaches the hands-off determination threshold $\beta$ without the absolute value of the driver torque Tsw' becoming more than the threshold $\alpha$ in the hands-on state (ST2) with the driver torque equal to or less than the threshold, the hands-on/off determination unit 53 determines that the steering wheel operation state has become the hands-off state (ST3) with the driver torque equal to or less than the threshold. The hands-on/off determination unit 53 sets the output signal (out) to zero, and sets the time counter value hod_timer to zero. The hands-off determination threshold $\beta$ is set to a value within the range of 0.5 [sec] or more and 1.0 [sec] or less, for example.

When the absolute value of the driver torque Tsw' becomes more than the threshold $\alpha$ in the hands-off state (ST3) with the driver torque equal to or less than the threshold, the hands-on/off determination unit 53 determines that the steering wheel operation state has become the hands-off state (ST4) with the driver torque more than the threshold. The hands-on/off determination unit 53 sets the output signal (out) to zero. In the case where the hands-on state (ST4) with the driver torque more than the threshold is determined, the hands-on/off determination unit 53 updates the time counter value hod_timer to a value obtained by adding the predetermined time Ts [sec] to the current value (hod_timer) each time Ts elapses.

When the absolute value of the driver torque Tsw' becomes equal to or less than the threshold $\alpha$ before the time counter value hod_timer reaches a predetermined hands-on determination threshold $\gamma$ (>0) in the hands-off state (ST4) with the driver torque more than the threshold, the hands-on/off determination unit 53 determines that the steering wheel operation state has become the hands-off state (ST3) with the driver torque equal to or less than the threshold, and sets the time counter value hod_timer to zero. The hands-on determination threshold $\gamma$ is set to a value within the range of 0.05 [sec] or more and 0.1 [sec] or less, for example.

When the time counter value hod_timer reaches the hands-on determination threshold $\gamma$ without the absolute value of the driver torque Tsw' becoming equal to or less than the threshold $\alpha$ in the hands-off state (ST4) with the driver torque more than the threshold, the hands-on/off determination unit 53 determines that the steering wheel operation state has become the hands-on state (ST1) with the driver torque more than the threshold. The hands-on/off determination unit 53 sets the output signal (out) to one, and sets the time counter value hod_timer to zero.

When the absolute value of the driver torque Tsw' is equal to or less than the threshold $\alpha$ at the time of start of computation, the hands-on/off determination unit 53 determines that the steering wheel operation state is the hands-off state (ST3) with the driver torque equal to or less than the threshold. The hands-on/off determination unit 53 sets the output signal (out) to zero, and sets the time counter value hod_timer to zero.

In the embodiment, the driver torque Tsw is estimated using the driver torque estimation observer (disturbance observer, extended disturbance observer). A high-frequency component of the estimated driver torque Tsw is removed. A hands-on/off determination is made using the torque threshold $\alpha$ and the time counter value hod_timer on the basis of the driver torque Tsw' after removal of the high-frequency component. Therefore, it is possible to precisely determine whether in a hands-on state in which a driver is grasping a steering wheel or a hands-off state in which the driver is not grasping the steering wheel.

The hands-on/off determination result can be utilized for mode switching control in a vehicle that has an automatic operation mode and a manual operation mode as operation modes, such as switching to the manual operation mode after confirming that the hands-on state has been established when switching is made from the automatic operation mode to the manual operation mode, for example.

The effect of the cut-off frequency of the low-pass filter 52 on the determination precision was examined. Specifically, the torsion bar torque Ttb detected by the torque sensor 11 when the vehicle is traveling on a paved road at a vehicle speed of 20 [km/h] with the steering wheel at the neutral position was measured chronologically. Such a measurement was made in each of the hands-on state and the hands-off state. In addition, the torsion bar torque Ttb detected by the torque sensor 11 when the vehicle is traveling on a bad road (stone-paved road) at a vehicle speed of 20 [km/h] with the steering wheel at the neutral position was measured chronologically. Such a measurement was made in each of the hands-on state and the hands-off state.

This experiment was conducted for the purpose of examining the effect of the cut-off frequency of the low-pass filter 52. Therefore, the acquired chronological data on the torsion bar torque Ttb were considered as the driver torque. A low-pass filtering process was performed on the acquired chronological data on the torsion bar torque Ttb using a plurality of types of low-pass filters with different cut-off frequencies. A desired threshold was set to determine hands-on in the case where the value of the chronological data after the low-pass filtering process was equal to or more than the threshold, and to determine hands-off in the case where the value of the chronological data after the low-pass filtering process was less than the threshold.

A false positive rate and a true positive rate at the time when the threshold was varied from zero to a sufficiently large value were calculated. The false positive rate refers to the percentage [%] at which the steering wheel operation state determination unit erroneously determined events that were actually hands-off as the hands-on state. The true positive rate refers to the percentage [%] at which the steering wheel operation state determination unit correctly determined events that were actually hands-on as the hands-on state. Such calculations were performed for each of the cases where the cut-off frequency fc of the low-pass filter was 1 [Hz], 3 [Hz], 5 [Hz], 7 [Hz], and 9 [Hz].

FIG. 7A is a graph illustrating the test result for a paved road. FIG. 7B is a graph illustrating the test result for a bad road. In FIGS. 7A and 7B, the horizontal axis represents the false positive rate, and the vertical axis represents the true positive rate. Each of the curves in FIGS. 7A and 7B indicates the test result for each of the cut-off frequencies. Each of the curves in FIGS. 7A and 7B was obtained by plotting points corresponding to the false positive rate and the true positive rate calculated for each of the thresholds.

For example, in the case where the threshold is zero (points at the right end of the graph), hands-on is always determined in the hands-on events, and hands-on is always determined in the hands-off events. That is, both the true positive rate and the false positive rate are 100%. In the case where the threshold is always larger than the driver torque (in this experiment, the torsion bar torque Ttb) (points at the left end of the graph), conversely, hands-off is always determined in the hands-on events, and hands-off is always determined in the hands-off events. That is, both the true positive rate and the false positive rate are 0%.

In the case where the determination precision of the steering wheel operation state determination unit is lowest, the graph has an inclination of 45 degrees, and the true positive rate and the false positive rate are equal to each other (an erroneous determination is caused at a probability of ½). In the case where the determination precision of the steering wheel operation state determination unit is highest, on the other hand, the graph rises along the Y axis (vertical axis), and extends in the direction of the X axis (horizontal axis) with the Y-axis value asymptotic to 100%.

It is seen from FIGS. 7A and 7B that the determination precision of the steering wheel operation state determination unit is lower for a bad road than for a paved road. It is also seen that the determination precision of the steering wheel operation state determination unit is higher as the cut-off frequency of the low-pass filter is lower in either road condition. If the cut-off frequency of the low-pass filter is low, however, the response of the hands-on/off determination is poor. From such viewpoints, the cut-off frequency of the low-pass filter is preferably 3 [Hz] or more and 7 [Hz] or less, more preferably 4 [Hz] or more and 6 [Hz] or less, most preferably 5 [Hz]. In the embodiment, the cut-off frequency of the low-pass filter 52 is set to 5 [Hz].

While an embodiment of the present invention has been described above, the present invention may be implemented in other embodiments. For example, in the embodiment discussed above, the driver torque estimation unit 51 uses the one-inertia-system model M1, and estimates the driver torque Tsw using a driver torque estimation observer. However, the driver torque estimation unit may use the two-inertia-system model M2 illustrated in FIG. 4, and estimate the driver torque Tsw using a driver torque estimation observer. Such a driver torque estimation unit 51A will be described in detail.

The equation of state for the two-inertia-system model M2 is represented by the following formula (11).

$$\begin{cases} \dot{\hat{x}}_e = A_e \hat{x}_e + B_e u_1 + L_e(y - \hat{y}) \\ \quad = (A_e - L_e C_e)\hat{x}_e + B_e u_1 + L_e y \\ \hat{y} = C_e \hat{x}_e \end{cases} \quad (11)$$

"^xe" (xe with a hat) in the formula (11) is a state variable vector, and is represented by the following formula (12).

$$\hat{x}_e = \begin{bmatrix} \theta_{sw} \\ \dot{\theta}_{sw} \\ \theta_{ww} \\ \dot{\theta}_{ww} \\ T_{sw} \\ T_{le} \end{bmatrix} \quad (12)$$

"u1" in the formula (11) is an input vector, and is represented by the following formula (13).

$$U1 = Tms \quad (13)$$

"y" in the formula (11) is an output vector (measured value), and is represented by the following formula (14). "^y" in the formula (11) is an estimated value of the output vector.

$$y = \begin{bmatrix} \theta ms \\ T_{tb} \end{bmatrix} \quad (14)$$

"Ae" in the formula (11) is a system matrix, and is represented by the following formula (15).

$$A_e = \begin{bmatrix} 0 & 1 & 0 & 0 & 0 & 0 \\ \frac{-k_{tb}}{J_{sw}} & \frac{-c_{tb}}{J_{sw}} & \frac{k_{tb}}{J_{sw}} & \frac{c_{tb}}{J_{sw}} & \frac{1}{J_{sw}} & 0 \\ 0 & 0 & 0 & 1 & 0 & 0 \\ \frac{k_{tb}}{J_{eq}} & \frac{c_{tb}}{J_{eq}} & \frac{-k_{tb}}{J_{eq}} & \frac{-c_{tb}}{J_{eq}} & 0 & \frac{1}{J_{eq}} \\ 0 & 0 & 0 & 0 & 0 & 0 \\ 0 & 0 & 0 & 0 & 0 & 0 \end{bmatrix} \quad (15)$$

"Be" in the formula (11) is an input matrix, and is represented by the following formula (16).

$$B_e = \begin{bmatrix} 0 \\ 0 \\ 0 \\ \frac{N}{J_{eq}} \\ 0 \\ 0 \end{bmatrix} \quad (16)$$

"Le" in the formula (11) is an observer gain matrix, and is represented by the following formula (17).

$$L_e = \begin{bmatrix} G_1 \\ G_2 \\ G_3 \\ G_4 \\ G_5 \\ G_6 \end{bmatrix} \quad (17)$$

"G1", "G2", "G3", "G4", "G5", and "G6" in the formula (17) are observer gains, and have been set in advance.

"Ce" in the formula (11) is an output matrix, and is represented by the following formula (18).

$$C_e = \begin{bmatrix} 0 & 0 & N & 0 & 0 & 0 \\ k_{tb} & 0 & -k_{tb} & 0 & 0 & 0 \end{bmatrix} \quad (18)$$

The driver torque estimation unit 51A computes the state variable vector ˆxe on the basis of the equation of state represented by the formula (11). Consequently, an estimated value of the driver torque Tsw is obtained.

Figure 8:
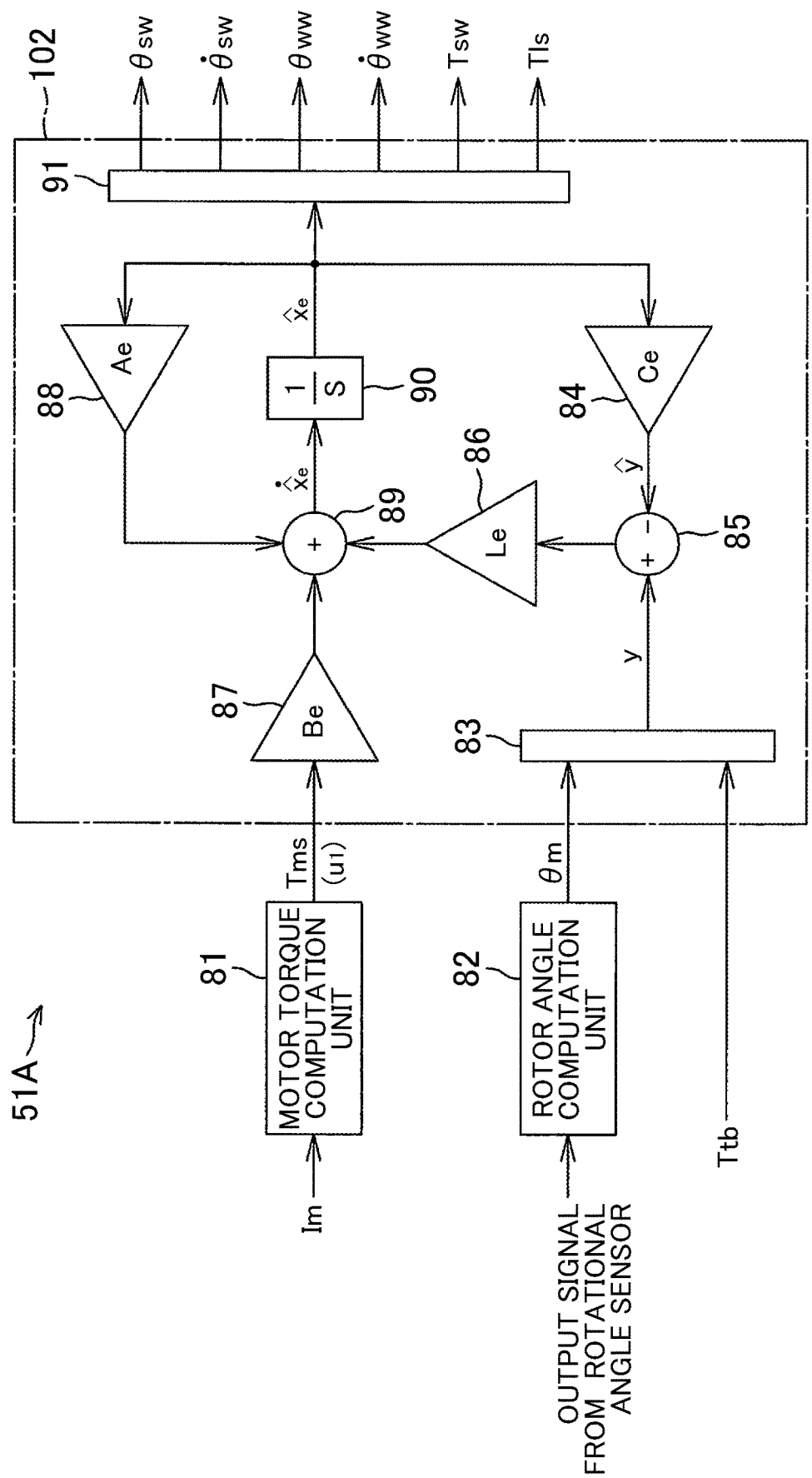
FIG. 8 is a block diagram illustrating another example of the configuration of the driver torque estimation unit.

FIG. 8 is a block diagram illustrating the configuration of the driver torque estimation unit 51A.

The driver torque estimation unit 51A includes a motor torque computation unit 81, a rotor angle computation unit 82, and a driver torque estimation observer 102. The driver torque estimation observer 102 includes an output vector input unit 83, an output matrix multiplier 84, a first adder 85, a gain multiplier 86, an input matrix multiplier 87, a system matrix multiplier 88, a second adder 89, an integrator 90, and a state variable vector output unit 91.

The motor torque computation unit 81 computes the motor torque Tms generated by the electric motor 18 by multiplying the motor current detected by the current detection unit 32 by a torque coefficient of the electric motor 18. The rotor angle computation unit 82 computes the rotational angle (hereinafter referred to as a "rotor rotational angle") θm of the output shaft of the electric motor 18 on the basis of the output signal from the rotational angle sensor 25.

The driver torque estimation observer 102 estimates the driver torque Tsw on the basis of the motor torque Tms computed by the motor torque computation unit 81, the rotor rotational angle θm computed by the rotor angle computation unit 82, and the torsion bar torque Ttb detected by the torque sensor 11.

The rotor rotational angle θm computed by the rotor angle computation unit 82 and the torsion bar torque Ttb detected by the torque sensor 11 are provided to the output vector input unit 83. The output vector input unit 83 outputs the output vector y (see the formula (14)).

The output from the integrator 90 is the state variable vector ˆxe (see the formula (12)). When the computation is started, an initial value of the state variable vector ˆxe is provided. The initial value of the state variable vector ˆxe is zero, for example.

The system matrix multiplier 88 multiplies the state variable vector ˆxe by the system matrix Ae (see the formula (15)). The output matrix multiplier 84 multiplies the state variable vector ˆxe by the output matrix Ce (see the formula (18)).

The first adder 85 subtracts the output (Ce·ˆxe) from the output matrix multiplier 84 from the output vector y. That is, the first adder 85 computes the difference (y−ˆy) between the output vector y and the estimated value of the output vector ˆy (=Ce·ˆxe). The gain multiplier 86 multiplies the output (y−ˆy) from the first adder 85 by the observer gain Le (see the formula (17)).

The input matrix multiplier 87 multiplies the motor torque Tms (input vector u1) computed by the motor torque computation unit 81 by the input matrix Be (see the formula (16)). The second adder 89 computes a differential value dˆxe/dt of the state variable vector by adding the output (Be·u1) from the input matrix multiplier 87, the output (Ae·ˆxe) from the system matrix multiplier 88, and the output (Le(y−ˆy)) from the gain multiplier 86. The integrator 90 computes the state variable vector ˆxe by integrating the output (dˆxe/dt) from the second adder 89. The state variable vector output unit 91 outputs the steering wheel angle (estimated value) θsw, the steering wheel angular velocity (estimated value) dθsw/dt, the worm wheel angle θww (estimated value), the worm wheel angular velocity dθww/dt (estimated value), the driver torque Tsw (estimated value), and the load torque Tls (estimated value) on the basis of the state variable vector ˆxe. The driver torque (estimated value) Tsw output from the state variable vector output unit 91 is provided to the low-pass filter 52 (see FIG. 3).

In the embodiment discussed above, the electric motor 18 is a three-phase brushless motor. However, the electric motor 18 may be a brushed direct-current (DC) motor.

What is claimed is:

1. A vehicle steering device comprising:
    a steering wheel;
    an input shaft to which the steering wheel is coupled;
    an output shaft coupled to the input shaft via a torsion bar;
    an electric motor coupled to the output shaft;
    a torque detector that detects a torsion bar torque applied to the torsion bar;
    a rotational angle detector that detects a rotational angle of the electric motor; and
    a microcomputer that is configured to:
        estimate a driver torque applied to the steering wheel using at least
            (i) the torsion bar torque detected by the torque detector,
            (ii) the rotational angle of the electric motor detected by the rotational angle detector, and
            (iii) a one-inertia-system physical model that is constructed with a torsion bar viscosity and a torsion bar rigidity; and
        determine whether the steering wheel is operated in a hands-on state or a hands-off state based on the estimated driver torque.

2. The vehicle steering device according to claim 1, wherein:
    the electric motor is coupled to the output shaft via a speed reduction mechanism;
    the speed reduction mechanism includes a worm gear rotationally driven by the electric motor, and a worm wheel coupled so as to be rotatable together with the output shaft and rotationally driven by the worm gear; and
    the driver torque is estimated using a rotational angle of the worm wheel and an angular velocity of the worm wheel, which are computed based on the rotational angle of the electric motor detected by the rotational angle detector, and the torsion bar torque detected by the torque detector.

3. The vehicle steering device according to claim 2, wherein
    the physical model is constructed with at least one of a steering wheel inertial movement and a lower column inertial movement, a lower column including the worm gear and the worm wheel.

4. The vehicle steering device according to claim 1, wherein
    the physical model is constructed with a steering wheel inertial movement.

5. The vehicle steering device according to claim 1, further comprising:
    a current detector that detects a motor current that flows through the electric motor, wherein
    the driver torque is estimated using a motor torque of the electric motor which is computed based on the motor current detected by the current detector, the rotational angle of the electric motor detected by the rotational angle detector, and the torsion bar torque detected by the torque detector.

6. A vehicle steering device comprising:

a steering wheel;

an input shaft to which the steering wheel is coupled;

an output shaft coupled to the input shaft via a torsion bar;

an electric motor coupled to the output shaft;

a torque detector that detects a torsion bar torque applied to the torsion bar;

a rotational angle detector that detects a rotational angle of the electric motor; and a microcomputer that is configured to:
- estimate a driver torque applied to the steering wheel using at least
  - (i) the torsion bar torque detected by the torque detector,
  - (ii) the rotational angle of the electric motor detected by the rotational angle detector, and
  - (iii) estimated outputs to correct an observer model of one-inertia-system; and
- determine whether the steering wheel is operated in a hands-on state or a hands-off state based on the estimated driver torque.

\* \* \* \* \*